United States Patent [19]
Lupi et al.

[11] Patent Number: 5,622,451
[45] Date of Patent: Apr. 22, 1997

[54] COMBINED APPARATUS FOR HANDLING MODULES AND TOOLS AND LAYING OF ELONGATED FLEXIBLE ARTICLES FROM A VESSEL SUPPORTED ON A BODY OF WATER

[75] Inventors: Ange Lupi, Marseille; Jean P. Branchut, Croix Chapeau, both of France

[73] Assignee: Stolt Comex Seaway AS, Stavanger, Norway

[21] Appl. No.: 506,204

[22] Filed: Jul. 24, 1995

[30] Foreign Application Priority Data

Dec. 16, 1994 [NO] Norway ................................. 944896

[51] Int. Cl.$^6$ .................................................. F16L 1/00
[52] U.S. Cl. ................................................ 405/158; 405/166
[58] Field of Search ................................. 405/158, 166, 405/168.3, 168.4, 165, 169, 170

[56] References Cited

U.S. PATENT DOCUMENTS

| | | | |
|---|---|---|---|
| Re. 28,922 | 8/1976 | Lloyd, III ................. | 405/166 |
| 4,264,234 | 4/1981 | Pras ....................... | 405/169 X |
| 5,346,333 | 9/1994 | Maloberti et al. ........ | 405/168.4 X |
| 5,464,307 | 11/1995 | Wilkins .................. | 405/170 X |

Primary Examiner—William P. Neuder
Attorney, Agent, or Firm—Young & Thompson

[57] ABSTRACT

A combined apparatus for handling modules and tools and laying of elongated flexible articles from a vessel supported on a body of water, including a vertical passage through the vessel and a frame structure supported above the vertical passage, guide means on said frame structure for guiding said elongated flexible articles from above and down through the frame structure and the vertical passage, tensioner means supported in said frame structure for applying tension in said elongated flexible article, means for storing of modules and/or tools on board said vessel, means for bodily moving said modules/tools from the storing means and towards said frame structure, means in said frame structure for allowing moving of said modules/tools into said frame structure to a position below said tensioner means and above said vertical passage, and means on said frame structure for supporting and lowering said modules/tools down through said vertical passage.

9 Claims, 5 Drawing Sheets

COMBINED APPARATUS FOR HANDLING MODULES AND TOOLS AND LAYING OF ELONGATED FLEXIBLE ARTICLES FROM A VESSEL SUPPORTED ON A BODY OF WATER

FIELD OF THE INVENTION

The present invention relates to a combined apparatus for handling modules and tools and laying of elongated flexible articles from a vessel supported on a body of water.

BACKGROUND OF THE INVENTION

According to prior art when laying a cable or pipeline offshore the cable or pipeline may be spooled off a reel or drum and lowered into the water through a vertical passage in the vessel. A frame structure may be supported above a such vertical passage, said frame structure including guide means for guiding the cable or pipeline from above and down through the frame structure and the vertical passage. Tensioner means supported in the tower-like frame structure are used for applying tension in the cable or pipeline.

It is also known to handle modules and tools through a vertical passage or moonpool on board a vessel.

Deck space is restricted on board a vessel and valuable deck space will be saved if one could combine the facilities for laying of cables/pipelines with those of handling modules and tools through a moonpool.

SUMMARY OF THE INVENTION

It is therefore an object of the invention to provide a combined apparatus for handling modules and tools and laying elongated flexible articles from a vessel supported on a body of water without the various means and components for such handling and laying interfering with another.

According to the invention, it is therefore provided a combined apparatus for handling modules and tools and laying elongated flexible articles from a vessel supported on a body of water, including a vertical passage through the vessel and a frame structure supported above the vertical passage, guide means on said frame structure for guiding said elongated flexible articles from above and down through the frame structure and the vertical passage, tensioner means supported in said frame structure for applying tension in said elongated flexible article, means for storing of modules and/or tools on board said vessel, means for bodily moving said modules/tools from the storing means and towards said frame structure, means in said frame structure for allowing a moving of said modules/tools into said frame structure to a position below said tensioner means and above said vertical passage, and means on said frame structure for supporting and lowering modules/tools down through said vertical passage.

Said means in said frame structure for allowing transportation of modules/tools into the frame structure may preferably comprise supporting legs adapted to support the frame structure including the tensioner means and guide means at a level above the vertical extension of said modules/tools when said modules/tools are moved towards a frame structure and into it to said position above said vertical passage. The modules/tools may then be lowered down through the vertical passage by elevating and handling means, preferably elevating and handling means mounted in the frame structure.

Said elevating means may preferably be adapted to hold said elongated flexible article when said tensioner means is not applying tension to said elongated flexible article.

The frame structure may preferably include a horizontal ring means on a frame top side, said ring means supporting said guide means and said elevating and holding means for horizontal rotational movement.

Said elevating and holding means may preferably comprise a winch mounted on said ring means.

Said tensioner means may preferably comprise a plurality of caterpillar tensioner belts.

The means for bodily moving said modules/tools into the frame structure preferably comprise skidding means, said skidding means enabling longitudinal and transverse skidding of modules/tools on deck, without any off the deck lifting operation.

BRIEF DESCRIPTION OF THE DRAWINGS

The invention is described in greater detail hereinafter relative to a non-limiting embodiment and the attached drawings wherein.

DESCRIPTION OF THE PREFERRED EMBODIMENT

Figure 1:
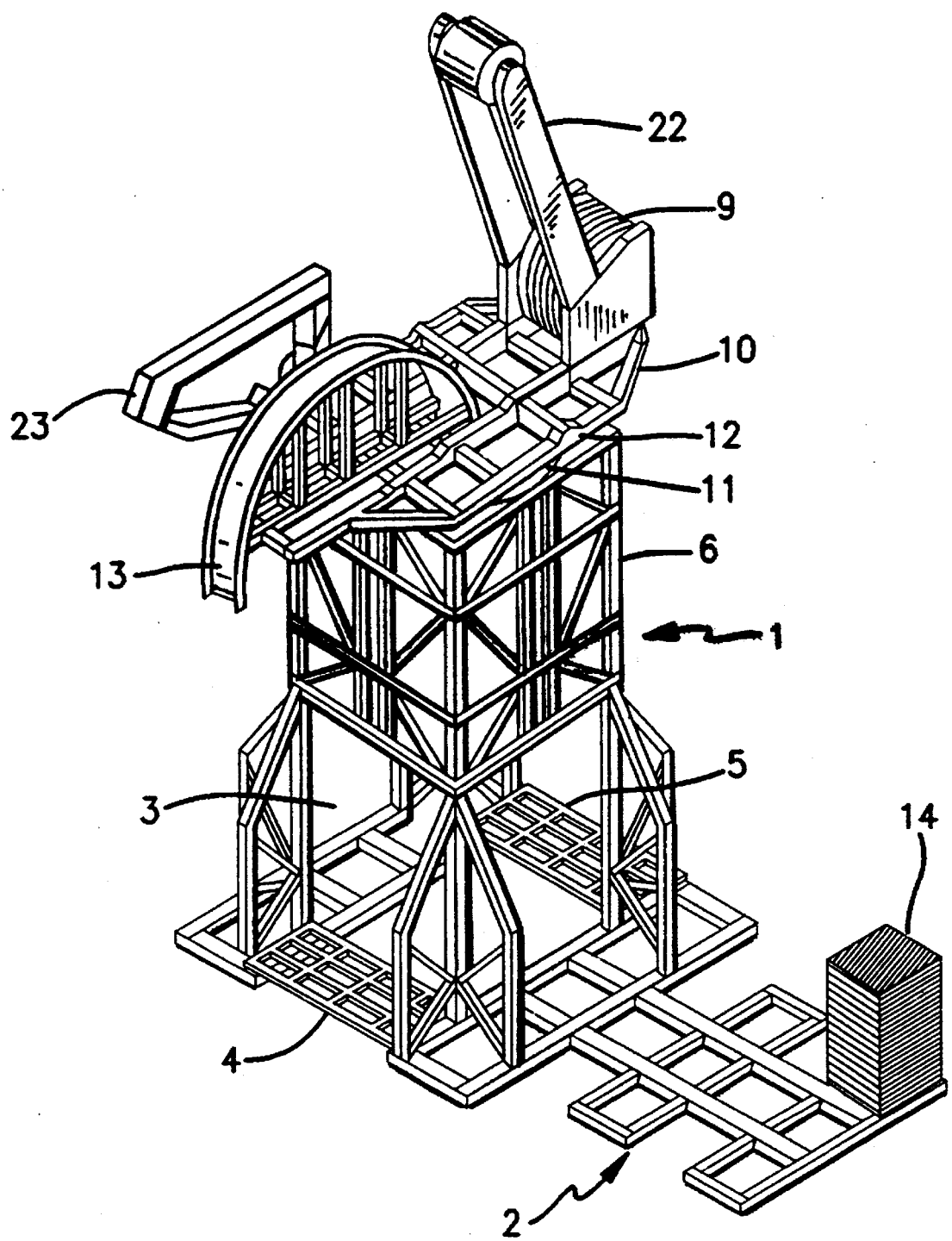
FIG. 1 is a perspective view of an apparatus according to the invention.

The apparatus in FIG. 1 includes a frame structure 1 and a storage and skidding structure 2.

Figure 2:
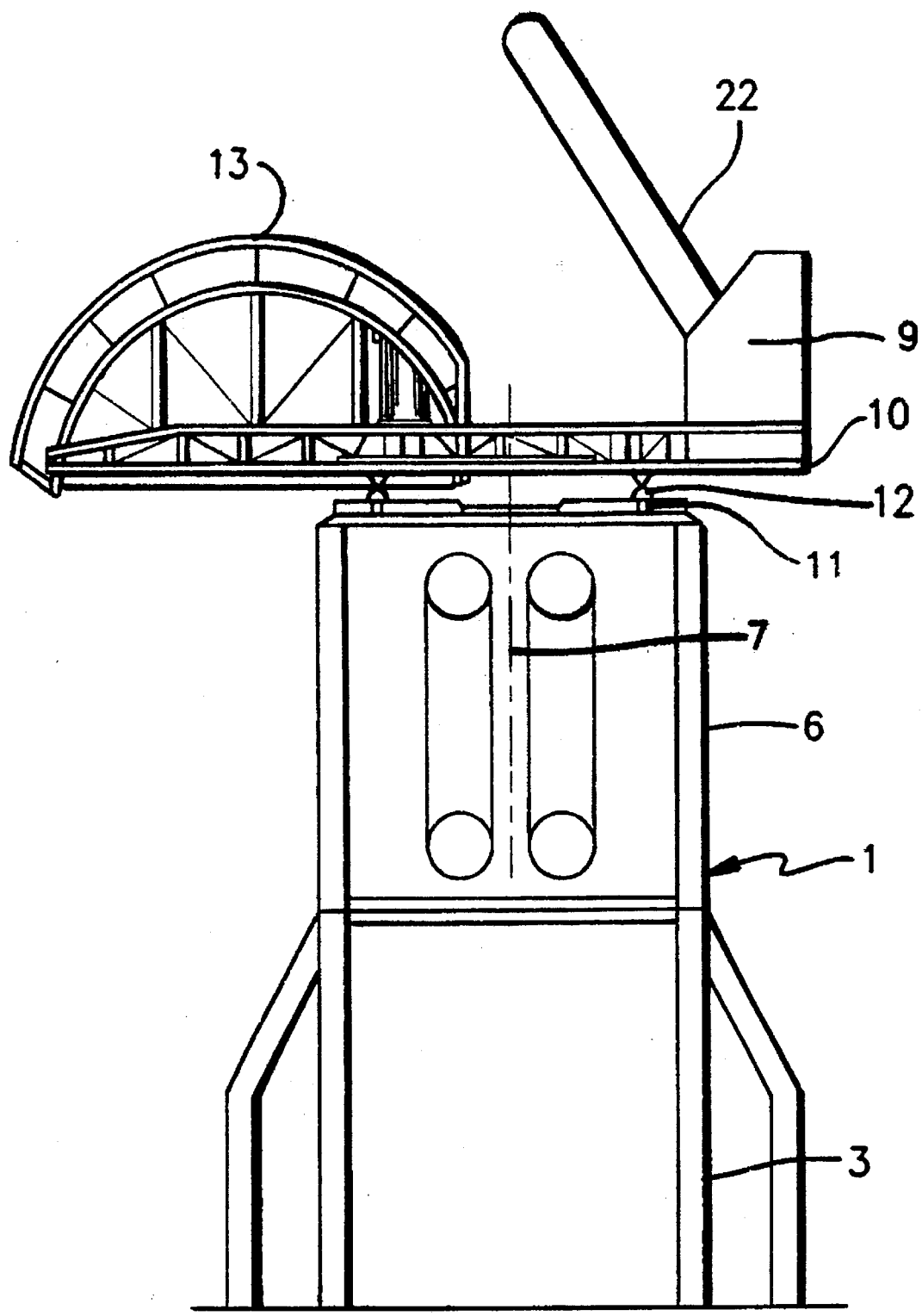
FIG. 2 is a schematic side view of the apparatus.

The frame structure has a lower part forming a working arch 3, in the bottom part of which there are two moonpool sliding doors 4 and 5. The frame structure 1 has an upper part 6 wherein caterpillar tensioners 7 are arranged (FIG. 2). Preferably there are a total of four caterpillar tensioners (only two shown in FIG. 2), each being moveable to and from a vertical centerline in the frame structure. An elongated article such as a cable can be laid out on the sea bottom, vertically through the frame structure and the underlying vertical passage 8 (FIG. 3) engaged by the tensioners 7. The tensioners may be moved radially outwards by means of suitable drive means (not shown) if and when necessary, for instance, to let a thickened cable part go through, in which case, the cable will be supported by auxiliary means, such as a wire from the winch 9.

The frame structure further includes a top side rotating assembly 10. This assembly 10 includes a circular rail 11 whereupon runs a carriage 12 which supports an arched guide means 13 as well as the winch 9. The carriage 12 may thus move in a circular path about a vertical axis corresponding to the vertical centerline in the frame structure.

The storage and skidding structure 2 is adapted for storing of modules and tools (one module 14 disclosed) and skidding of modules/tools into the working arch 3, to a handling position in the frame structure, above the vertical passage 8. In this position, a module or a tool may be elevated (lowered and raised) by suitable means, for instance, by means of the winch 9.

Figure 3:
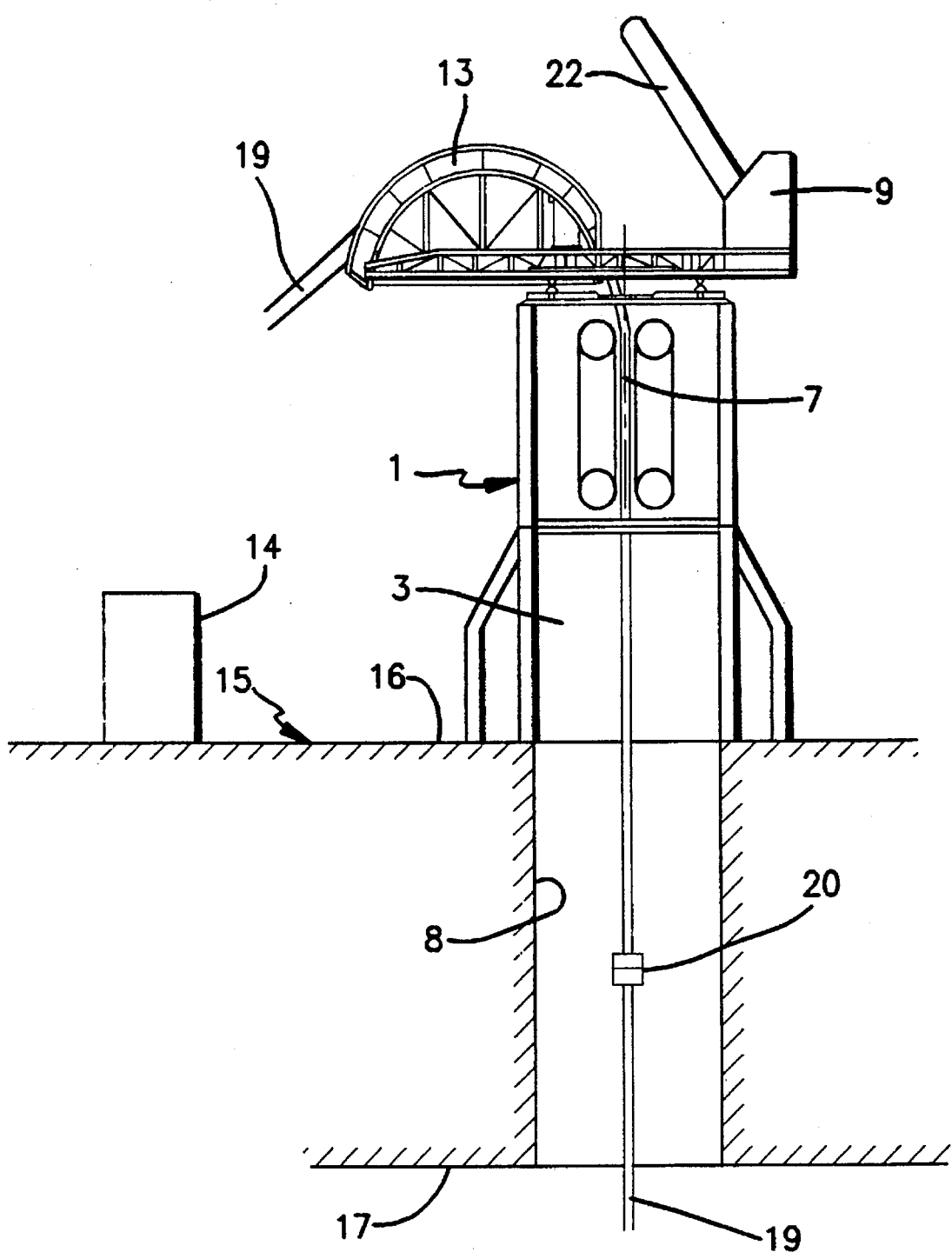
FIG. 3 is a schematic side view of the apparatus on board a vessel.

In FIG. 3, the apparatus hitherto described is placed on board a vessel 15 having a deck 16, a bottom 17 and a vertical passage or moonpool 8.

A reel (not shown) is supported on the vessel/deck 15. This reel carries a length of cable 19 wound thereon. When laid out, the cable 19 is unwound from the reel and is by means of the guide means 13 guided down into the frame structure 1 between the caterpillar tensioners 7. Thus, the cable 19 is laid down in the sea through the moonpool 8. The winch 9 is used for temporarily holding the cable 19 if and when for some reason the tensioner assembly is opened, for instance, if the cable 19 has an enlargement such as a joint 20.

The moonpool doors 4 and 5 (FIG. 1) are sliding doors which may be moved to and from each other and may be used to centralize and support the cable 19.

When not used for laying out a cable or a pipeline, the apparatus may be used for module handling procedures. Modules or tools may be transported from a storage position to a deployment position over the moonpool in the working arch S.

A vertical module handling system, e.g. including the winch 9 transports the modules and tools from deck level to for instance, a subsea template (not shown).

Figure 4:
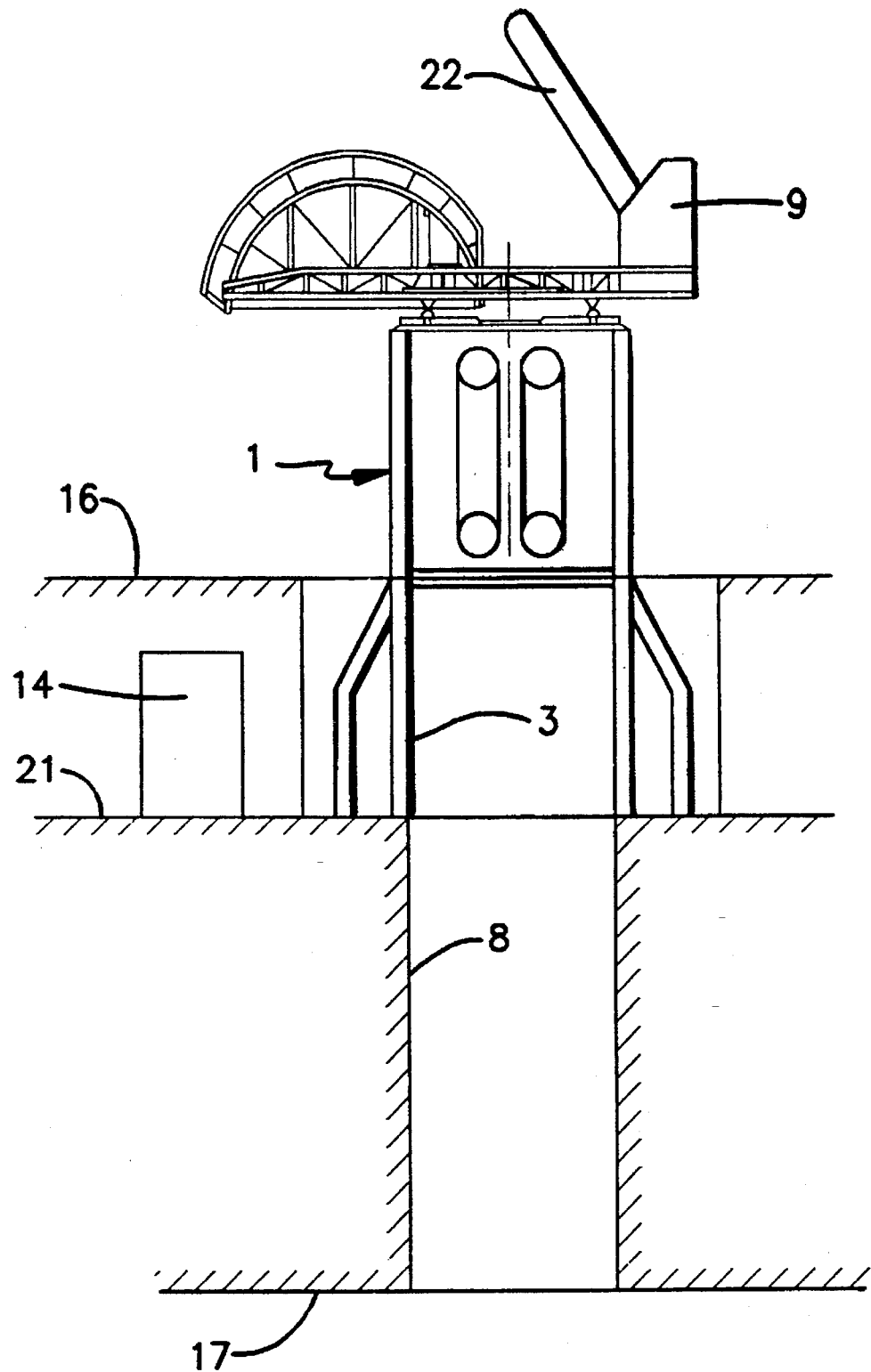
FIG. 4 is a schematic side view of the apparatus on board a vessel.

The arrangement in FIG. 4 is the same as in FIG. 3, the only difference being that the apparatus is arranged with the working arch at a tween deck level 21 where modules/tools 14 are stored and may be transported into the working arch S.

From the description so far, one will understand that there is provided a combined apparatus adapted for use for different operations, namely laying out of for instance, cable and horizontal and vertical handling of modules and tools as used in subsea operations.

Longitudinal and transverse transportation of modules on deck is possible, without any free lifting operation. Lowering of modules and tools (for instance, connection tools) is performed through a moonpool. During the latter operation the modules may be guided with known guide means in the sea. The elevating system, i.e. the winch 9, may of course include necessary heave compensation.

When in a laying out mode, a flexible cable or pipeline is deployed to a vertical position in between the caterpillar tensioners and lowered to the seabed through the moonpool.

The winch 9 includes an A-frame 22, which permits deployment of the winch cable from the centerline to the side of the tensioner or in between a flexible cable and the tensioner structure.

An extra crane structure is disclosed at 29. A number of handling winches (not shown) may be arranged at deck level around the apparatus.

Figure 5:
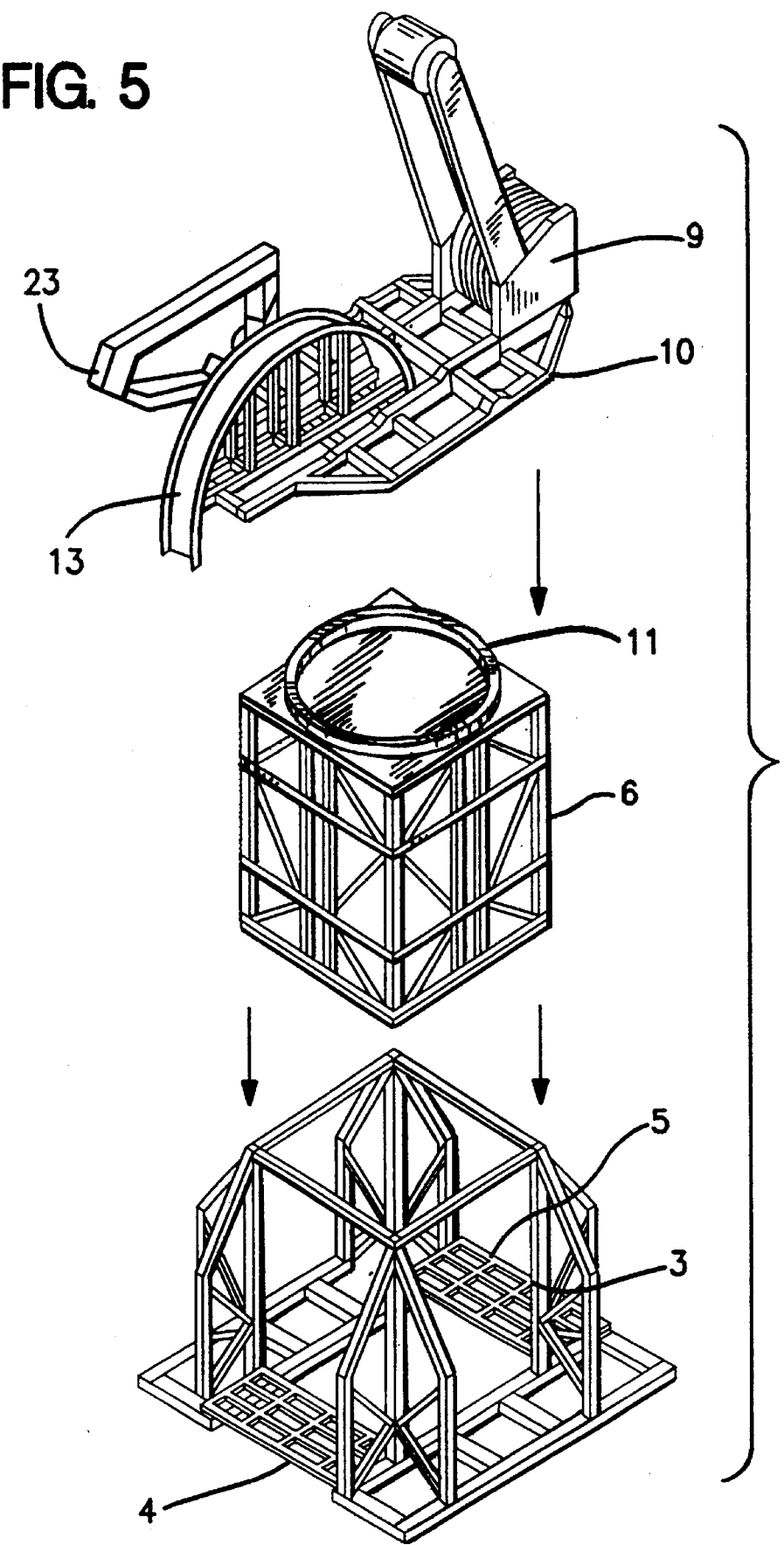
FIG. 5 is an exploded view of the frame structure of the apparatus.

As disclosed in FIG. 5 the apparatus may preferably include a frame structure having three main parts, namely a lower part 3 forming a working arch, a tower-like upper part 6 and a top side rotatable assembly 10.

These three parts may preferably be constructed separately and assembled on site (arrows in FIG. 5). This favours the construction on site (easier handling of components) and of course also a dismantling.

The fourth part of the apparatus—the storage and skidding unit 2—is not shown in FIG. 5.

Having described our invention, we claim:

1. A combined apparatus for handling modules and tools and laying of elongated flexible articles from a vessel supported on a body of water, including a vertical passage through the vessel and a frame structure supported above the vertical passage, guide means on said frame structure for guiding said elongated flexible articles from above and down through the frame structure and the vertical passage, tensioner means supported in said frame structure for applying tension in said elongated flexible article, means for storing of modules and/or tools on board said vessel, means for bodily moving said modules/tools from the storing means and towards said frame structure, means in said frame structure for allowing transportation of said modules/tools into said frame structure to a position below said tensioner means and above said vertical passage, and means on said frame structure for supporting and lowering said modules/tools down through said vertical passage.

2. A combined apparatus as in claim 1, said means in said frame structure for allowing transportation of modules/tools into the frame structure comprising supporting legs adapted to support the frame structure including the tensioner means and the guide means at a level above the vertical extension of said modules/tools when said modules/tools are moved towards the frame structure and into it to said position above said vertical passage.

3. A combined apparatus as in claim 1, wherein elevating and holding means are mounted in the frame structure.

4. A combined apparatus as in claim 3, said elevating and holding means comprising a winch adapted to hold said elongated flexible article when said tensioner means is not applying tension in said elongated flexible article and to deploy modules and tools which are positioned in said frame structure.

5. A combined apparatus as in claim 3, the frame structure including a horizontal ring means on a frame top side, said ring means supporting said guide means and said elevating and holding means for horizontal rotational movement.

6. A combined apparatus as in claim 1, said tensioner means comprising a plurality of caterpillar tensioner belts.

7. A combined apparatus as in claim 1, the means for bodily moving said modules/tools into the frame structure comprising skidding means, said skidding means enabling longitudinal and transverse skidding of modules/tools on deck, without any off the deck lifting operation.

8. A combined apparatus as in claim 1, including sliding doors for opening and closing of said vertical passage.

9. A combined apparatus as in claim 1, said frame structure including a lower part forming a working arch, a top part forming a tower-like structure and a top side rotatable part.

* * * * *